April 11, 1961 D. E. STEARNS 2,979,656
HOLIDAY DETECTOR
Filed Aug. 28, 1957 2 Sheets-Sheet 1
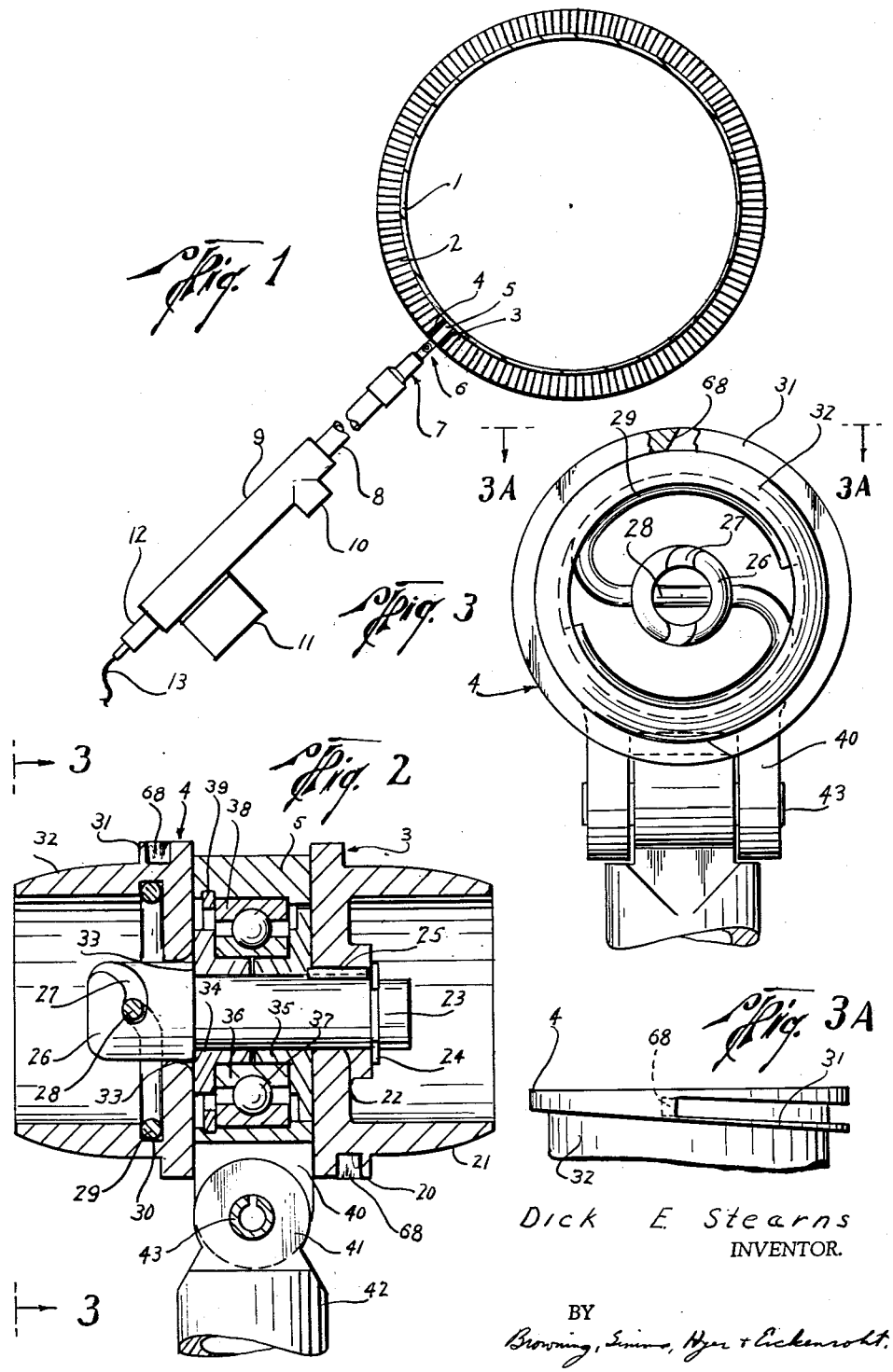
Dick E. Stearns
INVENTOR.
BY
Browning, Simms, Hyer & Eickenroht
ATTORNEYS April 11, 1961    D. E. STEARNS    2,979,656
HOLIDAY DETECTOR Filed Aug. 28, 1957    2 Sheets-Sheet 2

Dick E Stearns
INVENTOR.

BY

ATTORNEYS

United States Patent Office 2,979,656
Patented Apr. 11, 1961

2,979,656
HOLIDAY DETECTOR
Dick E. Stearns, P.O. Box 1234, Shreveport, La.
Filed Aug. 28, 1957, Ser. No. 680,883
10 Claims. (Cl. 324—54)

This invention relates in general to so-called holiday detectors adapted to inspect electrically with high voltage an insulating coating such as customarily employed on pipes and the like which are to be buried in the ground. Specifically, it has to do with a means for rolling a substantially continuous exploring electrode along the pipe or the like in inspecting the coating, and a means for mounting the high voltage supply and connecting it to the rolling electrode.

Heretofore, continuous exploring electrodes have been rolled by means of an instrument which is, in effect, a U-shaped yoke fitting over the electrode and terminating short of the pipe surface on either side of the electrode. Some such yokes have friction surfaces providing bearings against the electrode and others have rollers or the like providing anti-friction bearings against the electrode permitting the electrode to rotate and roll along the pipe as it is pushed by the yoke. Some such yokes have been connected to and carried by carriages carrying high voltage supply sources and rolling on wheels along the pipe. Others have been mounted on the ends of wands or handles carried by an operator, the high voltage supply source in the latter instance being carried on a carriage rolling along the ground adjacent the pipe or carried in a pack by the operator and connected to the yoke by a conductor extending along or through the handle.

Also, electrodes have been rolled along a pipe by means of a carriage interposed between the ends thereof and connected to said ends by swivel connections on opposite sides of the carriage. In such devices, dependence is placed on a spring or roller supporting the carriage for bridging such gap as may exist between the ends of the electrode to provide complete inspection about the pipe's circumference.

The type of electrode pusher and connector employing a yoke-like part fitting over the electrode has enjoyed great success and is widely used. However, in the case of a very large diameter pipe or pipes supported in elevated position so that their upper surfaces are not readily accessible so as to permit the use of a rolling carriage, and even a wand-type of pusher must be used from a position to beside and below the top of the pipe or even below the lower surface of the pipe, it has been found difficult to maintain the yoke on such wand-type pusher in full electrical contact with the electrode at all times.

It is an object of this invention to provide a pusher connection for a continuous rolling electrode which will be at all times in full electrical contact therewith. It is a further object to provide such a connection as a part of the joint between the ends of the electrode.

Another object is to provide a wand for such pusher connection and means for joining said wand to and readily detaching it from said pusher connection.

Another object is to provide a universal articulation between such wand and the bearing by which it is connected to the electrode.

Another object is to avoid necessity for use of a carriage or carry pack for transportation of the high voltage source.

Other objects and advantages of this invention will become apparent from the following description taken in connection with the accompanying drawing in which are set forth certain embodiments of the invention for purposes of illustration.

In the drawing:

Fig. 1 is a view showing a cross section through a pipe having the electrode and the pusher combination of this invention shown in its application thereto as it would be used in inspecting a coating on the pipe, and also illustrating in connection with the pusher the mounting of a high voltage unit thereon.

Fig. 2 is a view on a much enlarged scale illustrating in longitudinal cross section one form of connector for connecting the ends of the rolling electrode to each other and to a pusher element.

Fig. 3 is a view of the structure shown in Fig. 2 taken along the line 3—3 thereof and showing the same in end elevation.

Fig. 3a is a fragmentary top plan taken along the line 3a—3a of Fig. 3.

Fig. 4 is a view the upper portion of which is similar to Fig. 2 but which in its upper portion shows in longitudinal cross section a modified form of connector, and in its lower portion shows in longitudinal cross section the arrangement of parts for connecting the electrode to the pusher.

Fig. 5 is an exploded view illustrating the elements of the connector and other parts shown in Fig. 4.

Referring now more in detail to the drawing, a pipe 1 is shown in cross section and it will be presumed to have an insulating coating which is to be tested by the device of this invention. Surrounding this pipe and in engagement with the coating is a rolling electrode 2, shown as a coiled spring of circular cross section and of such a length that when caused to embrace the pipe 1 with its ends joined together, the coils of the spring will lie closely adjacent each other where they engage the coating on the surface of the pipe.

The ends of this electrode are connected together by complementary connector elements generally designated by the numerals 3 and 4, the details of which will be presently explained. One of these elements is provided with an intermediate portion intended to be located between the ends of the spring in use. This portion is of smaller diameter than the spring and adapted to receive a collar 5. This collar is of slightly smaller outer diameter than the spring, though closely approaching the outer diameter of the spring. A suitable example would be a collar of 1 5/16 inches diameter for use with an electrode 1 3/8 inches in diameter.

On one side of this collar there is projecting therefrom a part providing a pivotal connection or articulation 6 with a fitting 7 swivelly mounted on the end of an insulating wand or handle member 8. Intermediate the ends of this handle member 8 is an enlarged housing 9 in which is mounted a high voltage electrical source which in its details forms no part of this invention but which in its combination with the wand does form one phase of this invention. This electrical source is preferably of a type providing a pulsating high voltage so that its power consumption will be low enough to permit not only the source itself but a battery for supplying it with power to be carried on the wand or handle.

It is also desired that the wand or handle be provided with an enlargement on the housing or other suitable arrangement for accommodating an alarm 10 in the form of a bell or horn. The enlargement 11 is a housing for a battery or other power supply for furnishing power to the high voltage source.

Either an integral portion of the handle 8 or a separate similar member is provided projecting from the opposite end of the housing enlargement 9 so as to provide a hand grip 12 on the end of the housing 9 opposite from its connection through the handle 8 to the collar 5.

It will be understood that insofar as the pusher and connector for the handle to the electrode are concerned, this invention is not dependent upon the high voltage source being located in a housing 9 on the handle as illustrated, but that it is desirable to so locate the high voltage source in order that the entire holiday detector may be carried in a single unit by the operator. In the event that the high voltage source is not carried in the wand or handle, an electrical connector will be secured to the metal parts connected to the collar 5 and extended through the hollow handle 8 to emerge at 13 and extend to the location of a high voltage source. In the event that the high voltage source is located in the housing 9, then it will be understood that it is necessary that a return line to be dragged on the ground or otherwise connected to the metal of the pipe 1 will be extended from the high voltage source in the housing 9 and emerge at the end of a handle as shown at 13.

Turning now to the form of connector illustrated in Figs. 2 and 3, it will be seen that the connector element 3 has a spirally arranged holding flange 20 spaced slightly from the flange at the end of this connector element so as to receive one convolution of the coil spring forming the electrode. This connector is also tapered off with a rounded surface along the flange 21 which is intended to fit within the coil spring electrode, this tapering and rounding off aiding in the insertion of the connector element into the end of the coil spring, and more importantly preventing a sharp bend in the coil spring at the point where it leaves the holding flange 20 so that the coil spring will be unlikely to become permanently distorted at this point.

The front flange of the connector element 3 extends entirely across the end face thereof except for an opening 22 centrally of such face which is adapted to receive the stem 23 of the connecting spear element, this stem extending into the interior of the connector element through said opening and being held in place therein by means of a split ring 24 carried in a circumferential groove in the stem 23. At one side of the opening 22 there is provided a keyway and in the stem 23 there is provided a complementary keyway, these being adapted to receive a key 25 so that the stem 23 will be non-rotatably connected to the connector element and form a part thereof.

At its opposite end, this spear or male connector portion of the connector element 3 has an enlarged head 26 with a curved slot 27 therein adapted to be engaged by and to lock with respect to the diametrically extending portion 28 of the spring retainer member 29 that is carried in a groove 30 in the connector element 4.

The connector element 4 has a coil retaining flange 31 corresponding to the flange 20 on the element 3 so the coil spring may be screwed onto this connector element or the element screwed into the coil spring and locked in place therein. Likewise, this connector element has an axially extending flange curved on its outer surface so as to permit the spring which serves as the electrode to curve away from the connector without a sharp break adjacent the flange 31.

At the juncture between the head 26 and the stem 23 there is a shoulder 33 facing toward the face flange of the element 3. Thus there is provided around the stem 23 between this shoulder and the face flange of the element 3, a part on the composite element 3 which is of reduced diameter. Around this portion of reduced diameter is a pair of bushings 34 and 35 which together provide a channel extending circumferentially in which is retained the inner race 36 of a ball bearing 37. The outer race 38 of this ball bearing is held in place within the collar 5 by a split ring 39 and a shoulder on the opposite side of the race 38 integral with the collar 5.

Thus it will be clear that the collar 5 is slightly smaller in diameter than the coil spring adapted to be received by the two connector elements 3 and 4 and that it is freely rotatable on the stem 23 which forms part of the composite connector element 3. Furthermore, it will be seen that by rotating the parts 3 and 4 in a left hand direction with respect to each other the head 26 having the slot 27 may be disengaged from the diametrically disposed portion 28 of the spring retainer 29 carried by the element 4, whereupon the two elements connecting the ends of the spring may be separated from each other. They may be reconnected by the reverse of this operation, either operation requiring only a small movement and a fraction of a minute to execute.

At the same time, the collar 5 will provide a bridge between the face flanges of the elements 3 and 4 which is of just slightly smaller external diameter than these flanges so that while the flanges roll along the pipe being inspected, along with the spring electrode, the collar 5 may move along without rolling but in close proximity to the surface of the coating being inspected. Being at the same high voltage as the spring electrode, this collar will provide inspection along that portion of the coating over which it passes, even though it is not quite in contact therewith. Furthermore, by virtue of the rotatable mounting of the collar 5 on the connector element, the wand which will presently be described may be held at any angle with respect to the pipe axis and a perfect operation maintained with no danger of disconnecting the wand from the electrode either electrically or mechanically.

The connection of the wand to the collar 5 is provided through a pair of connecting ears 40 extending from the outer surface of the collar 5 at one side thereof and providing between them a space for the reception of an ear 41 on a metal fitting 42 which provides a part of the articulated connection to the wand. The ears 40 and 41 are held together by the pivot pin 43 whose axis is at substantially right angles to the axis of the collar 5 so as to permit the wand which is connected to the fitting 42 to be swung in a plane which substantially includes the axis of the collar 5 and hence of the electrode.

Another modified form of connector will now be described after which the remainder of the articulated joint with the wand will be explained.

The modified connector is illustrated in Figs. 4 and 5. It consists of complementary connector elements 3' and 4'.

The element 3' has a short spirally arranged locking flange 20' for locking to the adjacent end of a spring electrode as previously described. It also has an axially extending annular flange to project into the electrode. This flange has a curved outer surface 21' to prevent the electrode from being sharply bent at the connector.

A spear-like element forms a part of the composite connector element 3'. The front flange of element 3' has an opening 22' therethrough receiving the stem 23' of this spear element. The stem 23' is then held in place by means of a snap ring 24'. However, for the reason that the elements 3' and 4' do not need to be rotated with respect to each other, there is no necessity for making the stem 23' non-rotatable with respect to the body of element 3' and hence this form has no key corresponding to the key 25 of Fig. 2.

Opposite the retaining ring 24', the spear element has a head 26' and a neck 27' of smaller diameter than the head 26' connecting this head 26' with the main body of the spear member. The neck 27' fits within a narrow portion of a slot 28' in the face flange of the connector element 4' so as to retain these two elements in their interconnected position. Preferably the slot in the face plate of the element 4' is quite similar to that shown in Fig. 8 of Patent 2,332,182, or Fig. 5 of Patent 2,558,833. These patents also illustrate yoke-type pushers such as heretofore described, as well as the manner of mounting a pusher on a carriage carrying the high voltage source and riding along the top of the pipe being inspected.

The connector element 4' likewise has a spiral flange segment 31' similar to the flange segment 20' previously described, and an axially extending annular flange with its outer surface 32' curved like and for the same purpose as the curvature 21' on the element 3'.

The stem 23' has a shoulder 33' facing the opposite face flange of the element 3' so as to provide between them a channel. The inner race 36' of the ball bearing 37' is mounted between the shoulder 33' and the opposed face of the face flange on the element 3'. The outer race 38' of this ball bearing is mounted in the collar 5 as before and is held in place therein by means of a split ring 39.

Thus it will be seen that here also the two ends of the electrode are connected by means of complementary connector elements engaged with the respective ends of the electrode and adapted to be quickly attached to and detached from each other. As in Figs. 2 and 3, one of such complementary elements has mounted thereon a collar which may rotate with respect to the element and which hence may remain free from rotation while the element rotates along with the electrode in rolling along a pipe or the like.

The connector of Figs. 2 and 3 is advantageous in that the spring 29 at all times urges the elements 3 and 4 toward each other but will yield slightly to permit flexing as the electrode rolls, while that of Figs. 4 and 5 must be loose as shown at 66 so as to permit the head 26' to be engaged with slot 28' and then permit the elements 3' and 4' to flex as the electrode rolls. This necessitates an extra flange 67 on the spear element of Figs. 4 and 5 to retain the collar 5 in its proper position.

On the other hand, the elements 3' and 4' are free to rotate with respect to each other, so that there is no tendency to force them to rotate with respect to the spring and disconnect them from the spring. In Figs. 2 and 3 the elements 3 and 4 must be rotated with respect to each other to engage them with each other. This leaves the spring slightly wound and produces a small force tending to turn the spring ends to the left with respect to elements 3 and 4. In order that this might tend to tighten the spring on the connector elements this spring electrode is preferably left hand wound. Also, the ends of the spring wire and surfaces 68 against which they abut are inclined so as to draw these ends in toward the spring axis and prevent them from protruding and engaging the pipe coating.

Referring again to the wand connection, the element 42 has its shank portion hollow so as to receive a retainer plunger 45 which is pressed by spring 46 toward the open end of the element 42. It is retained by the pin 44 which extends diametrically across the element 42. This pin 44 is adapted to receive a locking head 47 which is similar in all its locking characteristics to the locking head 26. However, instead of engaging a spring-like cross pin such as the cross member 28 of Fig. 2, it engages a rigidly mounted cross pin 44 and its nose engages the spring pressed retainer 45 so that once it has been fully engaged with the pin 44 the spring 45 will hold the head 47 in locking engagement with the pin 44. This locking takes place through engagement of the pin 44 with the curved slot 48 in the head 47, which slot in effect forms two hooks, just as does slot 27. Both hook over the pin 44 when it is engaged with the slot 48 and the parts are rotated to the right relative to each other.

The fitting 42 then has a somewhat larger hollow shank portion extending beyond the pin 44 to receive the mounting body for the head 47. This head 47 has a stem 49 received within the hollow nose end of such mounting body and secured therein by a diametrically disposed locking pin 50. This mounting body has a nose portion 51 of a diameter to fit within the shank portion of the fitting 42, and adjacent thereto a portion 52 of substantially the same outer diameter as the shank of the fitting 42. A still larger hollow shank portion 53 is provided on this mounting body, the same being adapted to receive a swivel joint connection to the insulating handle or wand portion 8.

This connection comprises a plug member 54 adapted to be press fitted into the end of the insulating tube 8 forming the main body of the wand, and having a bearing supporting pin 55 projecting into the hollow interior of the shank portion 53 of the fitting 51.

Spaced back from the end of the stem 55 is a shoulder 56 facing toward the stem 55, and disposed on the stem 55 is a ball bearing having inner and outer races and balls interposed therebetween, the same having an axis substantially coincidental with the axis of the insulating tube 8 of the wand and being held in place by a split ring 58 disposed in a groove on the stem 55. The bearing assembly thus described is held in place within the hollow shank 53 of the fitting 51 by means of a bushing 59 press fitted into the shank 53 and having an inwardly extending flange 60 between the outer ball race of the bearing 57 and the adjacent end of the insulating tube 8 of the wand.

For the purpose of making an electrical connection with the plug member 54, the same is tapped in its base and adapted to receive a binding screw 63. To this binding screw is connected the electrical conductor 64 which extends up through the hollow wand or stem to the high voltage unit, this conductor having a terminal 65 adapted to be held beneath the head of the terminal screw 63. Thereby a positive electrical connection is provided to the plug member 54 which is of electrically conducting material, and through this plug member and the elements 52, 42 and the collar 5, as well as the bearings 57 and 37' or 37 as the case may be, the high voltage is impressed upon the collar 5, all of these elements being of metal or other electrically conductive material.

Furthermore, the connector elements 3 and 4 and 3' and 4' likewise being of electrically conductive material and being in direct electrical engagement with each other and with the rolling electrode, the high voltage thus conducted by the conductor 64 will be impressed upon the electrode. At the same time, the operator will be protected therefrom by virtue of the insulating qualities of the tubular wand handle 8.

In addition to providing a positive electrical connection to the electrode and providing a mounting for the high voltage unit and the power supply therefor and alarm to be sounded thereby when a holiday is detected, this invention provides a most desirable mechanical connection between the pushing wand and the rolling electrode. It has been previously explained that the mounting of the collar 5 permits the wand to be swung in an arc about an axis substantially coincidental with the axis of the connector elements 3 and 4 or 3' and 4' and also that the wand or handle may be swung in an arc in a plane substantially including the axis of the connector members, this latter being by virtue of the pivotal connection provided by the pivot 43. In addition to all of these, the handle may be twisted or rotated about its own axis by virtue of the bearing 57. Yet the connection of the wand to the electrode may be readily severed by merely twisting the element 42 with respect to the element 51 so as to disconnect the head 47 from the pin 44. It is also possible in the event the high voltage cannot be disconnected so as to permit the operation just described to be performed by grasping the elements 42 and 51 by hand, to make this disconnection by forcibly removing or pulling the end of the wand and bushing 59 from the fitting 51.

Nevertheless, the arrangement described, while permitting freedom of movement of the wand in every direction and ready disconnection thereof when desired, provides a connection which cannot be dislodged from the electrode unintentionally.

It will further be seen that a form of spring connection has been provided in which the ends of the spring wire will be prevented from springing or projecting outwardly to any degree so that they will not pierce or mar the coating on the pipe or other object during the inspection of the coating.

From the foregoing it will be apparent that by this invention the problems associated with pushing an electrode along a pipe where the upper surface of the pipe is not readily available to support a carriage or to permit the use of a yoke on the upper surface of the pipe, have been solved. The wand may extend in any desired direction to a contact with the electrode which cannot be broken either electrically or mechanically unless the operator desires. It may engage the electrode at any point around the circumference of the pipe which is most convenient. It can extend from the electrode in any desired direction or at any desired angle with respect to the electrode. It in no wise interferes with the rolling movement of the electrode. Furthermore, it provides a means for readily transporting the high voltage source without necessity for the use of a carry pack or a separate carriage. It will be appreciated, however, that in this latter connection the high voltage unit may, if found more desirable for any reason, be carried in any other manner than in the handle of the wand as indicated.

Other objects and advantages of this invention will become apparent from the accompanying claims and it is to be understood that this invention is to be limited only by the prior art and by the scope of the accompanying claims.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A holiday detector comprising, a flexible exploring electrode of substantially circular cross section, a pair of complementary quickly separable joint elements secured to the ends of said electrode to join them together in embracing relation with respect to a pipe whose surface is to be inspected, a collar of slightly less outer diameter than said electrode, surrounding and rotatably carried on one of said elements, a wand connection carried on and projecting from the outer surface of said collar, and a wand having insulated hand holding portions thereon and in operative engagement with said connection.

2. A holiday detector comprising, a flexible exploring electrode of substantially circular cross section, a pair of complementary quickly separable joint elements secured to the ends of said electrode to join them together in embracing relation with respect to a pipe whose surface is to be inspected, a collar of slightly less outer diameter than said electrode surrounding and rotatably carried on one of said elements, a wand connection carried on and projecting from the outer surface of said collar, a wand having insulated hand holding portions thereon and in operative engagement with said connection, said collar and joint elements being electrically conductive, and an electrical conductor electrically connected thereto for transmitting an electrical potential to said electrode.

3. A holiday detector comprising, a flexible exploring electrode of substantially circular cross section, a pair of complementary quickly separable joint elements secured to the ends of said electrode to join them together in embracing relation with respect to a pipe whose surface is to be inspected, a collar of slightly less outer diameter than said electrode surrounding and rotatably carried on one of said elements, a wand connection carried on and projecting from the outer surface of said collar, a hollow wand having insulated hand holding portions thereon and in operative engagement with said connection, said collar and joint elements being electrically conductive and an electrical conductor electrically connected thereto and extending through said wand for transmitting an electrical potential to said electrode.

4. A holiday detector comprising, a flexible exploring electrode of substantially circular cross section, a pair of complementary quickly separable joint elements secured to the ends of said electrode to join them together in embracing relation with respect to a pipe whose surface is to be inspected, a collar of slightly less outer diameter than said electrode surrounding and rotatably carried on one of said elements, a wand connection carried on and projecting from the outer surface of said collar, a hollow wand having insulated hand holding portions thereon and in operative engagement with said connection, said collar and joint elements being electrically conductive, and an electrical high voltage source disposed within said hollow wand, and an electrical conductor connected to said collar and extending through said wand to said high voltage source for transmitting a high electrical potential from said source to said electrode.

5. A holiday detector comprising, a flexible exploring electrode of substantially circular cross section, a pair of complementary quickly separable joint elements secured to the ends of said electrode to join them together in embracing relation with respect to a pipe whose surface is to be inspected, a collar of slightly less outer diameter than said electrode surrounding and rotatably carried on one of said elements, a universal joint wand connection carried on and projecting from the outer surface of said collar, and a wand having insulated hand holding portions thereon and in operative engagement with said connection.

6. A holiday detector comprising, a flexible exploring electrode of substantially circular cross section, a pair of complementary quickly separable joint elements secured to the ends of said electrode to join them together in embracing relation with respect to a pipe whose surface is to be inspected, a collar of slightly less outer diameter than said electrode surrounding and rotatably carried on one of said elements, a wand connection carried on and projecting from the outer surface of said collar, and a wand having insulated hand holding portions thereon and a quick detachable connector joining said wand to said wand connection.

7. As a subcombination, a pair of complementary quickly separable joint elements adapted to be secured to the respective ends of a rolling exploring electrode to secure said ends together, said elements having a diameter not greater than that of the electrode to which they are adapted to be secured, a collar of slightly less outer diameter than such electrode, surrounding and rotatably carried on one of said elements, and a wand connection carried on and projecting from the outer surface of said collar.

8. As a subcombination, a pair of complementary quickly separable joint elements adapted to be secured to the respective ends of a rolling exploring electrode to secure said ends together, said elements having a diameter not greater than that of the electrode to which they are adapted to be secured, a collar of slightly less outer diameter than such electrode, surrounding and rotatably carried on one of said elements, and a universal joint wand connection carried on and projecting from the outer surface of said collar.

9. As a subcombination, a wand for propelling a rolling electrode, comprising spaced insulated hand holding portions intermediate its ends, a connection at one end for mechanically and electrically connecting the wand to a rolling electrode in operative propelling relation thereto to cause such electrode to roll, means intermediate said hand holding portions for mounting and supporting an electrical high voltage source and alarm, electrical conducting means extending through said wand from said connection to said mounting and supporting means for electrically joining said connection to such source, and another electrical conducting means extending from said mounting and supporting means to the exterior of the wand a sufficient distance to provide a ground for such source.

10. As a subcombination, a joint means adapted to be secured to the respective ends of a rolling exploring electrode to secure said ends together, said means having a diameter not greater than that of the electrode to which it is adapted to be secured, a collar of slightly less outer diameter than such electrode, surrounding and rotatably carried on said means, and a wand connection carried on and exposed to the outer surface of said collar.

References Cited in the file of this patent
UNITED STATES PATENTS

| | | |
|---|---|---|
| 2,615,077 | Tinker | Oct. 21, 1952 |
| 2,629,002 | Tinker | Feb. 17, 1953 |
| 2,779,919 | West | Jan. 29, 1957 |
| 2,885,636 | Rasor | May 5, 1959 |